United States Patent
Hebert

[15] 3,642,081
[45] Feb. 15, 1972

[54] RAIL WEIGHING DEVICE, AND SUBASSEMBLY AND COMPONENT THEREFOR

[72] Inventor: Gerald A. Hebert, Skokie, Ill.
[73] Assignee: Mangood Corporation
[22] Filed: Sept. 28, 1970
[21] Appl. No.: 75,976

[52] U.S. Cl. ........................... 177/163, 177/211, 177/229
[51] Int. Cl. ............................. G01g 3/14, G01g 19/06
[58] Field of Search ............... 177/163, 210, 211, DIG. 8, 177/229

[56] References Cited

UNITED STATES PATENTS

| | | | |
|---|---|---|---|
| 2,681,566 | 6/1954 | Ruge | 177/211 |
| 3,009,056 | 11/1961 | Bone et al. | 177/211 |
| 3,155,184 | 11/1964 | Raskin | 177/163 |
| 3,446,298 | 5/1959 | Cory et al. | 177/163 |

FOREIGN PATENTS OR APPLICATIONS

| | | | |
|---|---|---|---|
| 859,630 | 1/1961 | Great Britain | 177/211 |

*Primary Examiner*—Robert S. Ward, Jr.
*Attorney*—Claron N. White

[57] ABSTRACT

A rail weighing device for the weighing of a load on a wheeled carrier or support riding on a rail transfer system, e.g., a monorail conveyor system. The device includes a subassembly that is mounted as a section of the rail of the system. The subassembly includes a novel rail section and strain-measuring means mounted on that rail section. At least part of the rail surface of the rail section is the top surface of a cantilever that is at least a part of the uppermost portion of the rail section. The strain gage is mounted on a surface of the cantilever to generate a signal proportional to the load on the carrier moving along the cantilever part of the rail section. The device includes means to convert that signal to an indicia of the weight of the load and means responsive to the presence of a wheeled carrier on the cantilever part of the rail section to operate the converter for a predetermined period of time.

23 Claims, 10 Drawing Figures

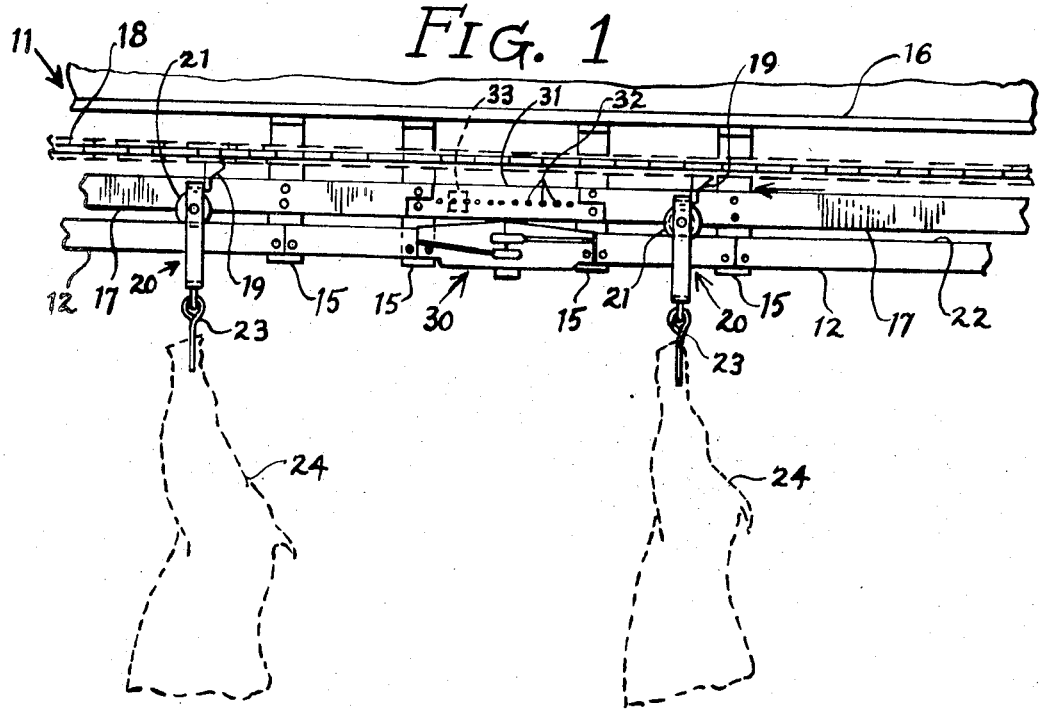
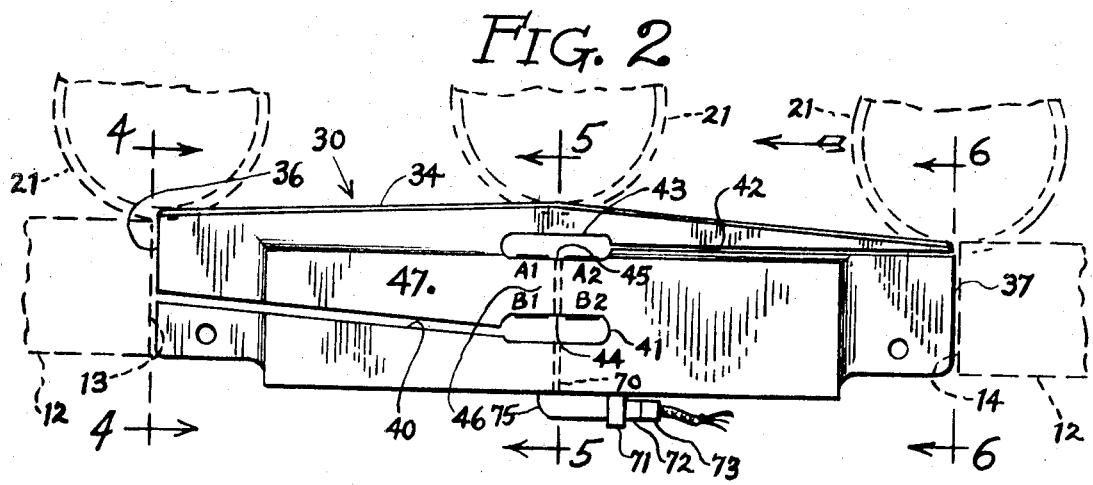
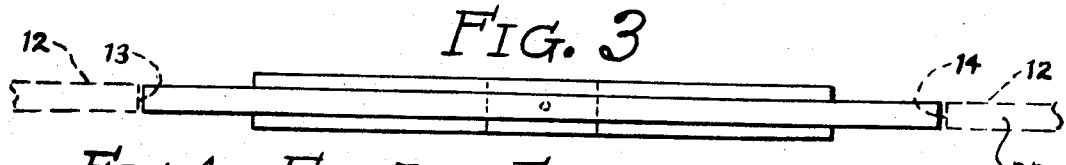
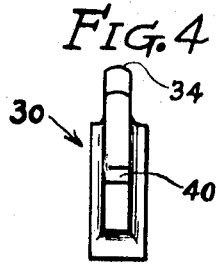
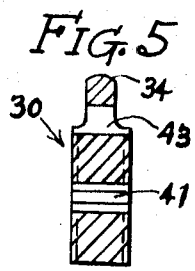
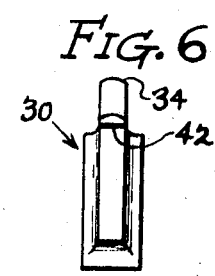
INVENTOR
Gerald A. Hebert
by Claron N. White
Att'y

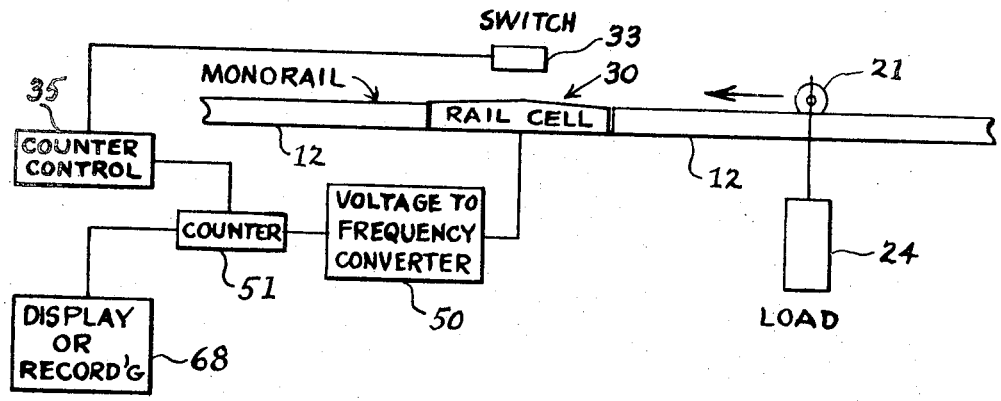
FIG. 7
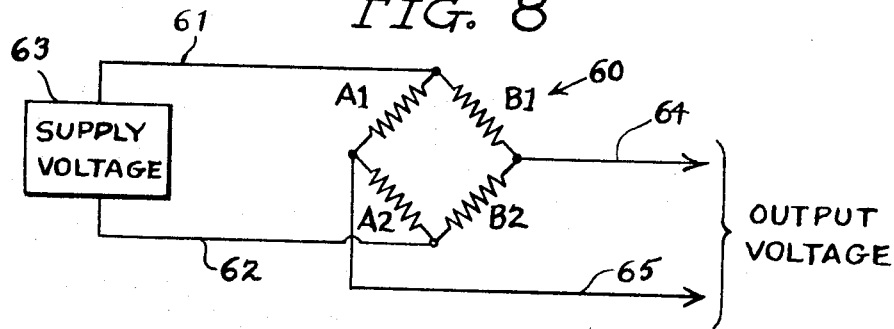
FIG. 8
FIG. 9
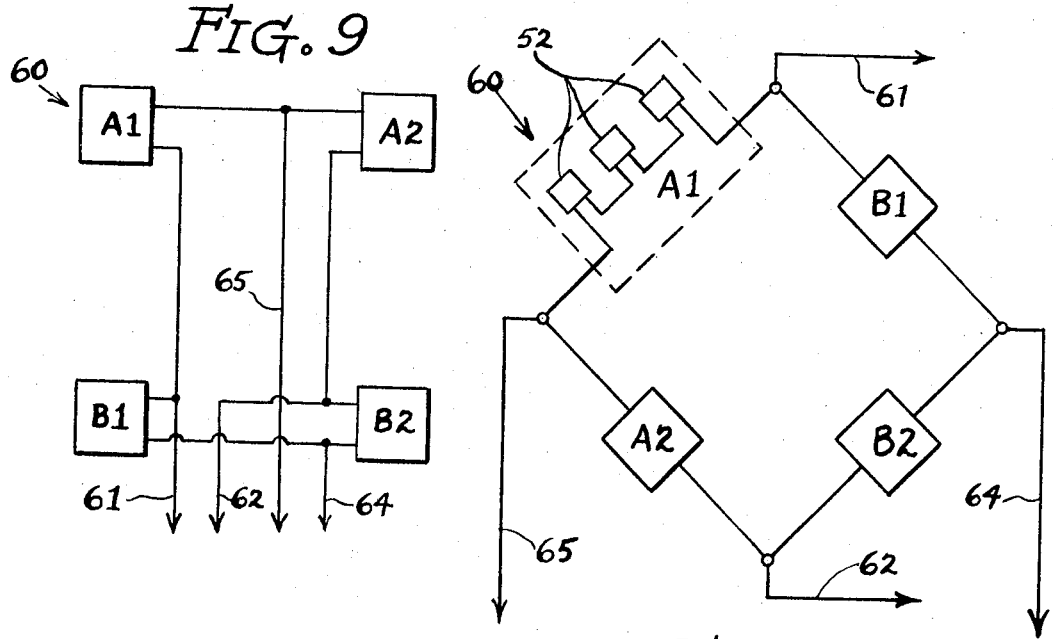
FIG. 10

RAIL WEIGHING DEVICE, AND SUBASSEMBLY AND COMPONENT THEREFOR

BACKGROUND OF THE INVENTION

1. Field of the Invention

This invention relates to a weighing device and to components therefor. It more particularly relates to a dynamic weighing device that generates an electrical output signal indicative of the weight of a load on a wheeled carrier moving along a rail conveyor system. The device is particularly useful for the weighing of animal carcasses on wheeled carriers that are moving on a monorail of a monorail conveyor system in a meat processing plant.

2. Description of the Prior Art

With respect to the preferred embodiment of the present invention, i.e., a weighing device that includes a novel rail section for the monorail of a monorail conveyor system to move animal carcasses in a meat processing plant, U.S. Pat. No. 3,108,648 describes the prior art. That patent states that a section of the monorail is coupled through its hangers by conventional weighing scale linkages to a conventional weighing scale head. The rail section is supported at both ends from above the section. The patent discusses the disadvantages of such weighing device. Those disadvantages are lessened by the use of a signal transducer, as described, but the manner of support of both ends of that rail section and the structure of that section remains unchanged.

In the broader aspect of the present invention, the prior art includes U.S. patents relating to inmotion or dynamic weighing devices for railroad cars moving along a pair of rails as a track that includes a portion having a pair of rail sections, each supported at both ends from below by standards in a weighing pit. Of course, the ends of these rail sections are in alignment with the adjacent ends of the main rails of the track. Typical of such prior art is U.S. Pat. No. 2,868,535 which uses an inclined rail system. The weighing device of the patent, as in the other relevant prior art, measures the load on the end supports or standards by the use of load cells, i.e., strain gages, to determine the weight of the car and its contents, if any. That device further includes means for preventing movement of the pair of rail sections in the general direction of their inclination. Another construction to avoid the disadvantages of a prior weighing system, i.e., to prevent such movement of the pair of rail sections, is disclosed in U.S. Pat. No. 2,716,547.

U.S. Pat. No. 3,446,229 discloses an improved system for dynamic weighing of railroad cars in motion over a weigh bridge having a pair of rail sections that are supported from below. The supports are adjacent the ends of the rail sections and the loads are determined by sensing the strain of the supports.

SUMMARY OF THE INVENTION

The weighing device of the present invention includes a rail section of unique construction. Although the rail section is mounted at its ends to supports, those supports can be the same supports for the main rail system, i.e., the same supports for the adjacent ends of the main rail system. The weighing device of this invention does not determine the strain in these supports. Instead the weighing device utilizes a part of the rail section as the load cell. In the case of a monorail conveyor system, this use of a part of the rail section to provide a part of the load cell eliminates the need of scale linkages connected to the ends of the rail section and to a scale head to determine the load on the conveyor's wheeled carrier.

The weighing device of the invention comprises the rail section with the special construction and at least one strain-measuring means mounted on a surface of the rail section. The combination of rail section and the strain-measuring means constitutes a subassembly of the device. That subassembly is a load cell that is hereinafter sometimes referred to as "rail cell." The rail cell has a construction such that an upper portion of it is a cantilever and the top surface of that cantilever constitutes at least part of the rail surface of the rail section. As described with respect to the preferred embodiment, that cantilever has its free or distal end at the end of the rail section and its proximal end adjacent but on the opposite side of the center line of the rail section.

As seen below, the weighing device generates an electrical output signal, e.g., an output voltage, that is converted by other means of the device to an indicia of the load on the cantilever part of the rail section. The device further includes means to initiate operation of the signal-converting means in response to the presence of a wheeled carrier on the cantilever part of the rail section.

The rail section has such cantilever part by virtue of an elongated slot that is open at one end and that extends along a line that is intermediate the top or rail surface of the rail section and the bottom surface of the rail section. That open end of the slot is at or adjacent the end of the rail section that can be referred to as the "downstream end" or the "exit end" of the rail section. The height of the slot at its inner end portion, i.e., the end portion of the slot furthest from its open end, is preferably greater to provide at that location a portion of the cantilever with reduced vertical dimension. That portion of the cantilever is at and adjacent the juncture of the cantilever with the rest of the rail section. The strain-measuring means is mounted on a surface of the cantilever part of the rail section that is a surface subjected to compressive strain or tensile strain when a load is on the cantilever, i.e., when a wheeled carrier is on the rail surface of the cantilever part of the rail section. When the rail section does not have the additional slot mentioned below, that strain-measuring means is preferably mounted on a surface to measure compressive strain and that preferred location is on the bottom surface of the cantilever part at the heightened inner end portion of the slot. That surface is the top surface of the heightened inner end portion of the slot.

The rail section can and preferably has additional structure that differs from a conventional rail section and that provides an upwardly facing surface for the cantilever part other than the rail surface of the cantilever part. That other surface will have a tensile strain when a load is on the cantilever part of the rail section. In that case, the strain-measuring means can be mounted on such surface. Alternately, strain-measuring means is mounted on that surface and another strain-measuring means is mounted on the bottom surface of the cantilever part as described above. Those two surface portions of the cantilever part are preferably flat, parallel to each other and with one being above the other. Preferably these strain-measuring means are resistance strain gages bonded to the surfaces and are electrically coupled to be two legs of a Wheatstone bridge circuit.

That other surface, of the cantilever, that will have a tensile strain, is present when the rail section has an elongated slot that is open at one end that is at or adjacent the other end of the rail section, i.e., the end that can be referred to as the "upstream end" or the "entrance end" of the rail section. The height of this slot at its inner end portion, i.e., the end portion of that slot furthest from its open end, is also preferably greater to provide at location, that is above the other heightened inner end portion of the first slot, a further reduced vertical dimension of that portion of the cantilever part of the rail section. With this construction the bottom surface of this inner end portion of the second slot is an upwardly facing surface of the cantilever that is subjected to tensile strain when a load is on the cantilever part of the rail section.

For the rail section with the two slots, as described above, the portion of the rail section above these two enlarged or heightened inner portions of the two slots and upstream of that location is not subjected to strain when a load is on the cantilever. This is because that portion of the rail section is at that time merely an extension of the cantilever in the other direction.

When the rail section has the construction described above as including the two slots, the resultant additional reduction in the height of the cantilever at and adjacent its juncture with the main part or rest of the rail section further enhances the degree of strain at that portion of the cantilever part of the rail section. Also that construction permits and has preferably the pair of parallel, horizontal surfaces to which strain gages are bonded. Two strain gages or two sets of strain gages, electrically coupled in series in a set, bonded on each surface can be electrically coupled as four legs of a Wheatstone bridge circuit to provide an output voltage proportional to the load on the cantilever. Such system renders the output less sensitive to temperature variation.

The use of strain gages as legs of a Wheatstone bridge circuit to provide a voltage output is well known. That use and the basic knowledge and description of different kinds of strain-measuring means appear in *The Strain Gage Primer* by C. C. Perry and H. R. Lissner, Second Edition, published in 1962 by McGraw-Hill Book Co., Inc., New York, N. Y.

Although the voltage output obtained in the preferred embodiment of the rail cell of the invention, as described in the next preceding paragraphs, can be processed in any of various ways to produce a readable display or recording of the weight of the load on the wheeled carrier, the voltage output of the rail cell is preferably an input to a voltage-to-frequency converter that generates an alternating voltage signal having a frequency that is proportional to that output voltage of the rail cell. That alternating voltage signal is processed by signal-converting means to an indicia representative of the weight of the load on the wheeled carrier, when the operation of the signal-converting means is initiated by means responsive to the presence of a wheeled carrier at a predetermined location on the cantilever part of the rail section. Thereafter for a predetermined period of time, during which the wheeled carrier will be moving along the rail surface of the cantilever part of the rail section, the number of cycles of the alternating voltage signal is determined by a counter. The count represents the net weight of the load. That count or representation can be displayed or recorded.

DESCRIPTION OF THE DRAWINGS

FIG. 1 is a fragmentary view of a monorail conveyor system in a meat processing plant and shows the preferred embodiment of the rail cell of the weighing device of the present invention mounted in place of a removed section of rail of the conventional construction in a monorail system.

FIG. 2 is an enlarged view of a portion of that seen in FIG. 1 to show the rail cell in greater detail.

FIG. 3 is a top plan view of the rail cell and also shows in phantom lines the adjacent end portions of the main monorail.

FIGS. 4, 5 and 6 are views taken along the lines 4—4, 5—5 and 6—6, respectively, of FIG. 3.

FIG. 7 is a schematic view of the main monorail, the wheeled carrier and its load, and the preferred embodiment of the weighing device of the present invention.

FIG. 8 is an electrical schematic of the Wheatstone bridge circuit of the rail cell.

FIG. 9 is a schematic of the electrical coupling of the bonded resistance strain gages to provide the Wheatstone bridge circuit of FIG. 8.

FIG. 10 is a further showing of the Wheatstone bridge circuit to illustrate in one leg of the Wheatstone circuit, applicable to all four legs, the electrical coupling in series of several strain gages to constitute a set of gages as a leg of the circuit.

DETAILED DESCRIPTION

As seen in FIGS. 1 and 2, a monorail conveyor system, generally indicated at 11, comprises a monorail 12 from which a section of the monorail has been removed to provide a gap between facing ends 13 and 14 of monorail 12. By hangers 15 the rail 12 is mounted on support member 16 that is above. A guard rail 17 is also mounted by hangers 15 on support member 16 that is above rail 17. The rail 17, that is above rail 12, also has a section removed. The resultant gap in rail 17 is above that of rail 12.

The conveyor system further includes a chain 18 on which are mounted depending pushers 19 at spaced positions along chain 18. The chain is driven by sprocket means (not shown). The pushers abut wheeled load carriers 20, each of which has a wheel 21 that rides on the top or rail surface 22 of monorail 12. The carrier 20 includes a hook 23 at the bottom part of carrier 20. An animal carcass 24 is mounted on hook 23 for movement of the carcass 24 from one place to another by system 11 and to weigh carcass 24 during such movement by the weighing device of the present invention. The guard rail 17 prevents wheeled carrier 20 from falling off monorail 12.

The foregoing construction of conveyor system 11, except for weighing device of the invention, is conventional for a meat processing plant. Of course, the monorail, chain etc., of the system extend in a closed loop between two locations.

In this embodiment of the invention, a section has been removed from both monorail 12 and guard 17. A rail section, generally indicated at 30, is mounted by the two adjacent hangers 15 that are used to support the free and opposing end 13 and 14 of monorail 12 where the section of monorail 12 has been removed. Also mounted by these hanger 15 is a guard rail section 31 having a number of holes 32 in horizontal alignment. Except for these holes, guard rail section is the same as the removed section of guard rail 17. However, by the use of an appropriate set of two of these holes 32, a presence-indicating switch 33 is mounted on guard rail 31 to be operative upon the arrival of wheel 21 of a carrier 20 at a desired position of its travel along top or rail surface 34 of rail section 30. When thus made operative, switch 33 initiates the operation of a counter control 35 (FIG. 7) to be described later. The rail surface 34 of rail section 30 of the preferred embodiment is inclined upwardly from both ends, that can be referred to as the downstream or exit end 36 and the upstream or entrance end 37. The ends 36 and 37 are chamfered and are close to and in general alignment with ends 13 and 14, respectively, of monorail 12 so that there is relatively smooth transfer of wheel 21 from surface 22 to surface 34 and back to rail surface 22.

The lower portion of rail section 30 has a hole adjacent each end for receiving a bolt to mount section 30 on hangers 15.

The rail section 30 has a generally horizontal, elongated slot 40 that extends from its open end at downstream end 36 of section 30 to a position that is past the centerline of rail section 30. At the centerline and on each side of it for a relatively short distance, as the inner end portion of slot 40, the slot 40 has an enlarged height to constitute a heightened inner end portion 41 of slot 40. The slot 40 is inclined downwardly from downstream end 36 of section 30 to heightened portion 41 merely to provide sufficient height of section 30 below slot 40 adjacent its open end for hole 38 adjacent end 36 while having at the same time slot portion 41 at the elevation shown for the reason seen below.

The rail section 30 also has a horizontal slot 42 that extends from its open end at upstream end 37 of rail section 30 toward end 36 sufficiently to provide for slot 42 a heightened inner end portion 43 that is in vertical alignment with and above heightened inner end portion 41 of slot 40. The top wall 44 of heightened inner portion 41 of slot 40 and the bottom wall or surface 45 of heightened inner portion 43 are flat and are parallel to each other and to the horizontal path of travel of wheel 21 on rail 12. The part 46 of rail section 30 between portions 41 and 43 of slots 40 and 42, respectively, is the inner or proximal portion of a cantilever part 47 of rail section 30. The cantilever 47 is above slot 40 and has rail surface 34 for its top surface. In view of slot 42, the portion of rail section 30 above 42 and not above any part of slot 40 can be considered to be merely an upstream extension of cantilever part 47 to end 37 of section 30. That extension has the balance of the length of rail surface 34.

In this preferred embodiment, rail surface 34, although inclined upwardly from the ends 36 and 37 of section 30, in a longitudinal direction is flat except for two short portions where the inclined portions merge with a short horizontal portion that is located above slot inner portions 41 and 43, is spaced from the centerline of section 30, but is between that centerline and end 37. The two merging portions are arcs that have a center of curvature for each below section 30. Illustratively for a particular installation, the included angle between the horizontal and the inclined rail surface adjacent end 36 is 2° while the included angle between the horizontal and the inclined surface adjacent end 37 is 3°, when the conveyor system is such as to provide a conveyor speed of 20 feet per minute. In that case the height of section 30 is 3.517 inches. For such system with a speed of 40 feet per minute, those included angles are one-half degree and 1°, respectively, and the height of section 30 is 3.308 inches.

This structure of rail section permits wheeled carrier 20 and its load (carcass 24) to roll ahead of pusher 19 along rail surface 34 above slot 40, i.e., to roll therealong without contact with pusher 19. It is during this free rolling of wheel 21 on surface 34 that presence-indicating switch 33 is energized to initiate operation of counter control 35. For a predetermined period of time, e.g., 0.25 second, control is operative to electrically couple the output of a voltage-to-frequency converter 50 to a counter 51.

The rail section is combined with strain-measuring means to provide a subassembly of the weighing device of the invention. In the preferred embodiment, four sets of resistance strain gages are used. These sets are designated as A1, A2, B1 and B2. The first two sets are mounted on bottom surface 45 of heightened inner portion 43 of slot 42 to sense tensile strain of inner portion 46 of cantilever 47 of rail section 30. The gage sets B1 and B2 are mounted on tops surface 44 of heightened inner portion 41 of slot 40 to sense compressive strain. Of course, bottom surface 45 and top surface 44 are actually the top and bottom surfaces, respectively, of inner portion 46 of cantilever 47. Each of the four sets of strain gages can be a number of individual strain gages 52 that are coupled in series, such as shown for A1 in FIG. 10.

The sets of strain gages A1, A2, B1 and B2 are electrically connected as seen in FIGS. 8, 9 and 10 to constitute the four legs of a Wheatstone bridge circuit, generally indicated at 60, that is electrically connected by wires 61 and 62 to a supply voltage 63. The wires 64 and 65 are connected to circuit between A1 and B2 and between B1 and A2, respectively. The wires 64 and 65 carry the output voltage generated by circuit 60 to converter 50 that converts the voltage to an alternating voltage signal. That output of converter 50 is the input for counter 51 that counts the number of cycles for a predetermined period of time upon its operation being initiated by switch 33. The total count represents the weight and can be made directly readable in pounds of weight of the load 24 on carrier 20, the carriers 20 all having the same weight for a specific system.

The wires to and from gages A1, A2, B1 and B2 pass through a vertical hole 70 adjacent the center line of section 30. The hole 70 extends from the bottom of section 30 up to inner portion 43 of slot 42. The wires 61, 62, 64 and 65 extend through hole 70 to slots 40 and 42 to couple with gages A1, A2, B1 and B2. A cable connector retainer 71 is mounted on the bottom surface of section 30. A cable connector 72 is mounted on retainer 71 and a cable 73 is held by connector nut 74. In a box 75 that is mounted on section 30, adjacent retainer 71, wires 61, 62, 64 and 65 are connected to four wires (not numbered) of cable 73 and two of these wires are connected to supply voltage 63 and two are connected to converter 50.

In this embodiment the strain is measured at two positions that are longitudinally spaced and the difference of these strains is used to provide an output voltage that is thus proportional to the load and is independent of the load position along the cantilever 47 of rail section 30.

The use of carriers of the same weight is the simplest type of system. As stated earlier, the foregoing description is merely illustrative of the preferred embodiment of the invention as utilized for meat carcass weighing while the carcass is in motion. It is not necessary that rail surface 34 be doubly inclined. It has been found possible to determine the weight of a load within adequate accuracy while a pusher is in contact with a wheeled carrier.

The present invention is limited only by the claims that follow.

I claim:

1. A rail section for a rail conveyor system and useful with strain-measuring means to provide a rail cell to measure the weight of a load on a wheeled carrier moving along a portion of the rail surface of the rail section, said rail section having
    an elongated slot extending from one end of the rail section with the slot being open at that end so as to provide above the slot a part of the rail section that can function as a cantilever with an upper surface constituting at least part of the rail surface of the rail section.

2. The rail section of claim 1 wherein said elongated slot has a heightened inner end portion to provide a reduced height of the cantilever part of the rail section at and adjacent its juncture with the rest of the rail section.

3. The rail section of claim 1 wherein said rail section has a second elongated slot extending from the other end of the rail section, said second slot being open at that other end and extending a sufficient distance from its open end to have an inner end portion that is above the inner end portion of the first slot so as to provide a reduced height of the cantilever part at and adjacent its juncture with the rest of the rail section and to provide an upwardly facing surface at the inner portion of said second slot that is subjected to tensile strain when a load is on the cantilever part of the rail section.

4. The rail section of claim 3 wherein both slots of said rail section have a heightened inner end portion, in vertical alignment with each other, to provide a further reduction of said height of said cantilever part at and adjacent said juncture.

5. The rail section of claim 4 wherein the top surface of the first slot at its heightened inner end portion and the bottom surface of the second slot at its heightened inner end portion in alignment with said top surface of the first slot are flat and are parallel to each other so as to provide parallel surfaces of the cantilever part that are subjected to compressive strain and to tensile strain, respectively, when a load is on the cantilever part of the rail section.

6. The rail section of claim 5 wherein said rail section has a top rail surface that is upwardly inclined from both ends.

7. The rail section of claim 6 wherein it is a monorail section and wherein the part of the rail section other than the cantilever part has a hole adjacent each end for receiving mounting means to support the rail section from above with the ends of the rail section in alignment with spaced ends of a monorail so as to provide a substantially continuous rail surface.

8. A subassembly for a rail weighing device for a rail conveyor system, said subassembly comprising:
    the rail section of claim 1; and
    strain-measuring means mounted on a surface of said cantilever part of the rail section that is subjected to strain when a load is on said rail surface of said cantilever part.

9. The subassembly of claim 8 wherein said strain-measuring means is resistance strain gage means.

10. The subassembly of claim 9 wherein said resistance strain gage means comprises two resistance strain gages, as a set, that are mounted in longitudinally spaced alignment to measure strain so that the difference of strain can be utilized to provide an output voltage proportional to the load but independent of the load's location on the cantilever part of the rail section.

11. The subassembly of claim 10 wherein the top surface of the inner end portion of the slot is flat and horizontal, that inner end portion is heightened to provide a reduced height of the cantilever part of the rail section at and adjacent its juncture with the rest of the rail section, and the strain gages are mounted on said flat surface.

12. The subassembly of claim 8 wherein:
    said elongated slot has a heightened inner end portion to provide a reduced height of the cantilever part of the rail section at and adjacent its juncture with the rest of the rail section;

said rail section has a second elongated slot extending from the other end of the rail section, said second slot being open at that other end and extending a sufficient distance from its open end to have an inner end portion that is above the inner end portion of the first slot so as to provide a further reduced height of the cantilever part at and adjacent its juncture with the rest of the rail section and to provide an upwardly facing surface at the inner end portion of said second slot that is subjected to tensile strain when a load is on the cantilever part of the rail section;

the top surface of the first slot at its heightened inner end portion and the bottom surface of the second slot at its heightened inner end portion in alignment with said top surface of the first slot are flat and are parallel to each other so as to provide parallel, horizontal, flat surfaces of the cantilever part that are subjected to compressive strain and tensile strain, respectively, when a load is on the cantilever part of the rail section;

said strain-measuring means is resistance strain gage means; and said resistance strain gage means comprises two resistance strain gages, as a set, that are mounted in longitudinally spaced alignment on one of said flat, parallel surfaces to measure strain so that the difference of strain can be utilized to provide an output voltage proportional to the load but independent of the load on the cantilever part of the rail section.

13. The subassembly of claim 12 wherein said set of strain gages is mounted on said top surface of the heightened inner end portion of the first slot.

14. The subassembly of claim 12 wherein said set of strain gages is mounted on said bottom surface of the heightened inner end portion of the second slot.

15. The subassembly of claim 14 wherein said resistance strain gage means includes a second set of two resistance gages that are mounted on said top surface of the heightened inner end portion in said longitudinally spaced alignment.

16. The subassembly of claim 15 wherein said rail section has a top rail surface that is upwardly inclined from both ends.

17. A rail weighing device for a rail conveyor system having a rail on which a wheeled carrier with a load, to be weighed, is moved, said weighing device comprising:

the rail section of claim 1;

strain-measuring means mounted on a surface of said cantilever part of the rail section that is subjected to strain when a load is on said rail surface of said cantilever part, said strain-measuring means generating a signal by the strain proportional to the load;

presence-indicating switch means mounted relative to the cantilever part to indicate a presence of a wheeled carrier on the cantilever part before substantial movement of the carrier to the distal end of the cantilever part;

means responsive to said switch means and operated upon such response to receive said signal and to convert said signal to an indicia of the weight of the load on the cantilever part, said rail section to be mounted in place of a rail section of conventional construction of the system.

18. The rail weighing device of claim 17 wherein said means responsive to said switch means and operative to convert said signal includes:

means to convert said signal to alternating voltage;

means to count the cycles indicia the alternating voltage; and means initiated by said switch means to couple said converter means to said counter means for a predetermined period of time, whereby said count provides an indicia of the weight of the load on the cantilever part of the rail section.

19. The rail weighing device of claim 18 wherein:

said elongated slot of said rail section has heightened inner end portion to provide a reduced height of the cantilever part of the rail section at and adjacent its juncture with the rest of the rail section;

said rail section has a second elongated slot extending from the other end of the rail section, said second slot being open at that other end and extending a sufficient distance from its open end to have an inner end portion that is above the inner end portion of the first slot so as to provide a further reduced height of the cantilever part at and adjacent its juncture with the rest of the rail section and to provide an upwardly facing surface at the inner end portion of said second slot that is subjected to tensile strain when a load is on the cantilever part of the rail section;

the top surface of the first slot at its heightened inner end portion and the bottom surface of the second slot at its heightened inner end portion in alignment with said top surface of the first slot are flat and are parallel to each other so as to provide parallel, horizontal, flat surfaces of the cantilever part that are subjected to compressive strain and tensile strain, respectively, when a load is on the cantilever part of the rail section;

said strain-measuring means is resistance strain gage means; and said resistance strain gage means comprises two resistance strain gages, as a set, that are mounted in longitudinally spaced alignment on one of said flat, parallel surfaces to measure strain so that the difference of strain can be utilized to provide an output voltage proportional to the load but independent of the location of the load on the cantilever part of the rail section, whereby said converter means is a voltage-to-frequency converter.

20. The rail weighing device of claim 19 wherein said set of strain gages is mounted on the top surface of the heightened inner end portion of the first slot.

21. The rail weighing device of claim 19 wherein said set of strain gages is mounted on the bottom surface of the heightened inner end portion of the second slot.

22. The rail weighing device of claim 21 wherein said resistance strain gage means includes a second set of two resistance gages that are mounted on said top surface of the heightened inner end portion of the first slot in said longitudinally spaced alignment.

23. The rail weighing device of claim 22 wherein said rail section has a top rail surface that is upwardly inclined from both ends.

* * * * *